United States Patent

Lauck

[11] 3,915,743
[45] Oct. 28, 1975

[54] BATTERY WITH NEGATIVE LITHIUM ELECTRODE

[75] Inventor: Helmut Lauck, Schlossborn, Germany

[73] Assignee: Varta Batterie A.G., Hannover, Germany

[22] Filed: June 26, 1974

[21] Appl. No.: 483,362

[30] Foreign Application Priority Data
July 7, 1973 Germany............................ 2334660

[52] U.S. Cl. ............................................. 136/6 LN
[51] Int. Cl.² ........................................ H01M 10/00
[58] Field of Search ............ 136/6 LN, 100, 155, 20

[56] References Cited
UNITED STATES PATENTS

| | | | |
|---|---|---|---|
| 3,393,093 | 7/1968 | Shaw et al. | 136/6 LN |
| 3,423,242 | 1/1969 | Meyers | 136/6 LN |
| 3,639,174 | 2/1972 | Kegelman | 136/6 LN X |
| 3,658,592 | 4/1972 | Dey | 136/6 LN |
| 3,806,369 | 4/1974 | Dey et al. | 136/6 LN |

*Primary Examiner*—John H. Mack
*Assistant Examiner*—C. F. LeFevour
*Attorney, Agent, or Firm*—Weiser, Stapler & Spivak

[57] ABSTRACT

A battery with a negative lithium electrode and an organic electrolyte comprising boron trifluoride and a mixture of an alkyl carbonate and an ether such as dimethyl carbonate and 1,2-dimethoxy ethane.

9 Claims, 1 Drawing Figure

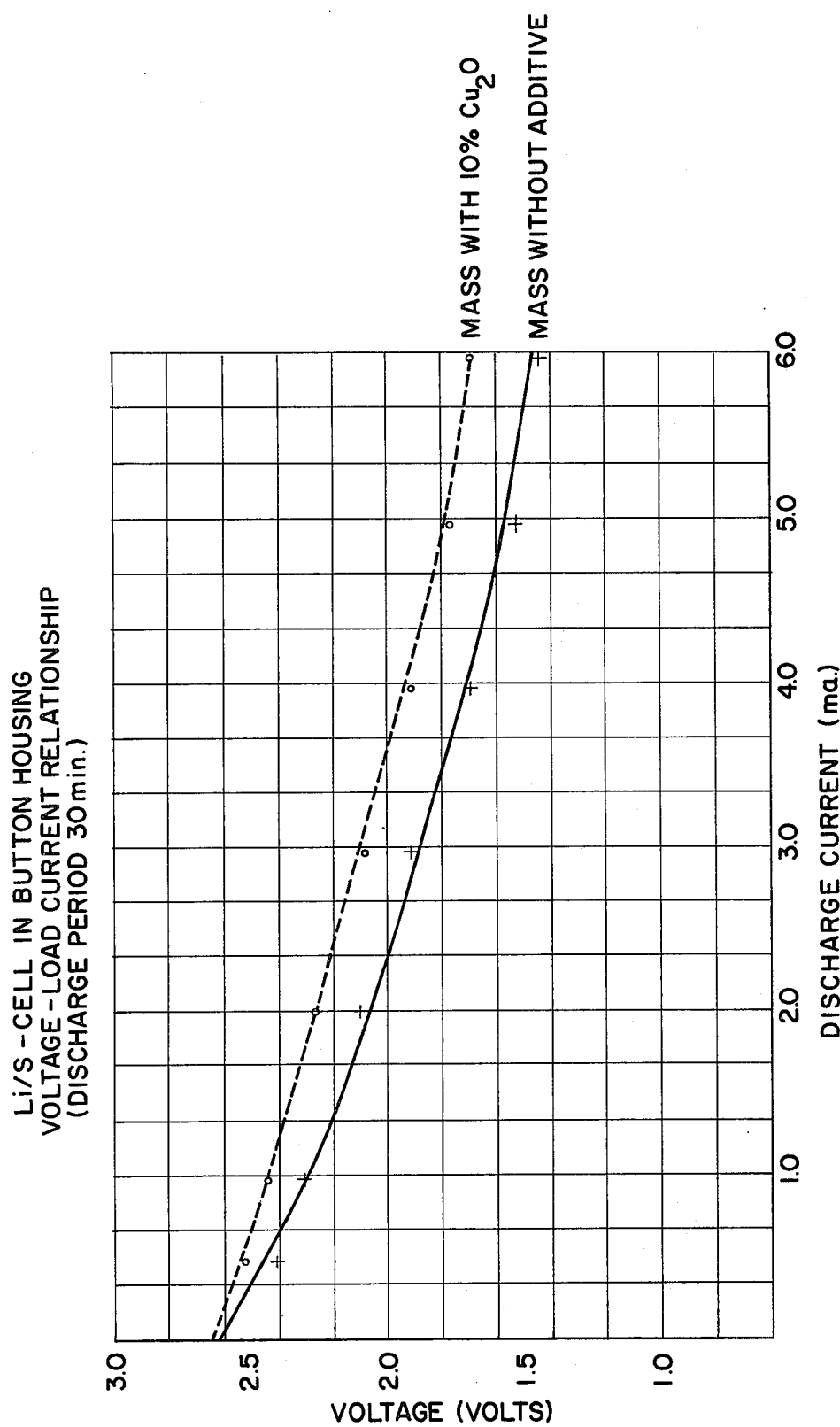

BATTERY WITH NEGATIVE LITHIUM ELECTRODE

This invention relates to a battery with a negative lithium electrode, a positive sulphur electrode and an electrolyte of an organic solvent which contains boron trifluoride.

German Pat. No. 1,671,996, published Oct. 28, 1971, discloses a battery which contains as electrolyte an organic solvent such as propylene carbonate, nitromethane, butyrolactone, or mixtures of these solvents. To this electrolyte there is added boron trifluoride, as well as other compounds which increase its conductivity. The purpose of the boron trifluoride is to promote the consumption of the sulphur as completely as possible to deliver electric current and at the same time to minimize the formation of polysulphides.

An object of the invention is to provide a battery of the prior art type, but which has improved storage properties and provides satisfactory discharge characteristics and high electrical current yield with small spacings between the electrodes.

This object, and others which will appear, are achieved in accordance with the invention by using an organic electrolyte which contains certain alkyl carbonates and ethers, and at least about 15% by weight of boron trifluoride. The amount of the boron trifluoride which can be used in the battery of the invention may vary from about 30 to 10%. With smaller amounts of boron trifluoride the yields are not as satisfactory.

Graphs showing certain characteristics of the invention are presented in the accompanying single FIGURE of drawing.

In order to obtain high energy densities and high discharge voltages, it is generally necessary to make the free electrolyte space as small as possible and to maintain the distances between electrodes as short as possible. In order to obtain high current yield, given the limited electrolyte volume available in the cell because of the desired high energy density, it has been found that the content of boron trifluoride concentration should be at least about 10%, but preferably at least 15% by weight.

The relationship between the electrical output in a lithium sulphur cell and the ratio of sulphur to boron trifluoride is shown in the following table.

| Weight Ratio of Sulphur: BF$_3$ | Electrical Output (percent) |
|---|---|
| 1 : 0.25 | 14.6 |
| 1 : 0.50 | 15.7 |
| 1 : 1.0 | 27.5 |
| 1 : 1.5 | 63.2 |
| 1 : 2.0 | 83.5 |

It has been shown that many solvents are attacked by boron trifluoride, causing changes which adversely affect the shelflife of the cell. The solvents embodying the invention are not so attacked, even during extended cell storage, but remain stable in the presence of boron trifluoride. For instance, the dimethyl carbonate (DMC) and 1,2-dimethoxy ethane (DME) are stable in the presence of boron trifluoride. However, they form addition compounds with boron trifluoride whose stability is not so great as to prevent reaction of the boron trifluoride with the discharge product which is necessary to inhibit the formation of polysulphide during discharge of the sulphur electrode. This reaction is required to achieve nearly complete consumption of the sulphur during discharge.

The organic electrolyte of the battery of the invention comprises a mixture of a di(lower alkyl) carbonate, wherein the lower alkyl is preferably up to 3 carbon atoms such as dipropyl, di isopropyl, diethyl and dimethyl and a glycol ether of the general formula $$CH_3O - (CH_2CH_2O-)_m CH_3$$

or $$C_2H_5O - (CH_2CH_2O-)_m C_2H_5$$

wherein $m$ is the integer 1 or 2, an ether like diethyl or di-isopropyl ether. Dimethyl carbonate (DMC) and 1,2-dimethoxyethane (ethylene glycol dimethyl ether) (DME) are preferred for reasons of effectiveness and economics.

The organic electrolyte is preferably composed of about 1 part by weight of the carbonate to 2 parts by weight of the ether, such as 1 part by weight of DMC and about 2 parts by weight of DME. However the ratio of the carbonate to ether of DMC to DME can be within the range of 1 : 0.5 to 1 : 3. It is preferred not to go beyond that range.

The boron trifluoride is introduced as a gas into the mixture of solvents preferably cooled to a temperature of about −10°C, until the desired concentration is reached. The required content of boron trifluoride depends on the cell construction. In the generally used forms, however, it should not fall below 15% by weight (relative to the solvent mixture) and preferably not below about 20% by weight.

It is preferable to use conducting salts in the mixture of solvents in the electrolyte. Preferred is LiBF$_4$ or LiAlCl$_4$. Other known equivalent salts are also useful. It is to be noted that with an excess of BF$_3$, in the electrolyte LiF can also be added. BF$_3$ and LiF then form the complex salt LiBF$_4$ and an excess of BF$_3$ is necessary to prevent the formation of polysulphides during discharge. The concentration of conductive salts ranges from about 0.5 m to 1.5 m, and generally it is quite acceptable if it is about a 1 m concentration.

The invention is further illustrated by the following non-limiting examples.

EXAMPLE 1

The construction of a positive electrode is carried out as follows. The positive electrode is made of sulphur which is preferably insoluble. This sulphur is finely ground with a conductive material like carbon black, graphite, activated charcoal or a mixture of these substances. It is then mixed with a substance which increases the porosity of the electrode. A suitable substance is asbestos in the form of fibers having lengths of about 1 to 10 mm.

Depending on the requirements, there can be added to the mass a binding material such as tetrafluoroethylene. The binder may be precipitated onto a portion of the conductive metal from an aqueous dispersion. The conductive material, containing this binder if desired, is then dried at high temperature in a vacuum before mixing with the other required mass ingredients.

In a typical composition for the positive mass the following ingredients are used.

| | |
|---|---|
| Sulphur | 30 to 70 percent by weight |
| Binding material | 0 to 12 percent by weight |
| Asbestos | 2 to 10 percent by weight |
| Conductive material | 20 to 68 percent by weight |

For the construction of wrapped electrodes, the positive mass is then pressed or rolled onto expanded aluminum or, if it is desired to prepare a button cell, the mass if pressed into tablet shaped form. The tablet can be packaged in aluminum mesh or expanded metal. For improved conductivity it may also be provided with one or more intermediate layers of these metals.

For the construction of a wrapped electrode, it is preferable that the mass contains at least 8% of binder. The tablets for button cells can be made without any binding material, or with a lesser amount of binding material.

The electrodes are dried in a vacuum before being incorporated into a cell.

The negative electrode of the battery is made of lithium foil, which is pressed onto expanded copper or nickel. As separator there may be used batting made of glass or a synthetic resin such as polypropylene, which are resistant to to the electrolyte.

The organic electrolyte for such a battery may be composed of 10 to 40 percent by weight dimethyl carbonate, 20 to 45 percent by weight 1,2-dimethoxy ethane, 20 to 30 percent by weight $BF_3$ and 5 to 12 percent by weight conductive salt. A preferred electrolyte is composed of about 20 percent by weight dimethyl carbonate, about 45 percent by weight 1,2-dimethoxy ethane, about 25 percent by weight $BF_3$, and about 10 percent by weight $LiBF_4$.

The cell container is of aluminum or aluminum alloy. For button cells, the container cover can be made of aluminum plated with copper or steel or of nickel-coated steel. To better anchor the lithium foil, a piece of expanded copper or nickel can be welded into the cover. As sealing material polytetrafluoroethylene is used.

The battery of the invention provides very good shelf life, high terminal voltage, and good current yield even with very small distances between the electrodes.

EXAMPLE 2

The dimethyl carbonate of Example 1 is replaced by di-ethyl carbonate in equivalent proportion. The battery, like that of Example 1, has a very satisfactory discharge voltage.

EXAMPLE 3

The electrolyte in the battery of Example 1 is replaced by a mixture of diethyl ether with diethyl carbonate. Likewise very satisfactory results are obtained. The electrolyte is stable on long range storage.

EXAMPLE 4

The electrolyte of Example 1 is replaced and the organic mixture in the electrolyte comprises diisopropyl ether and dimethyl carbonate. Equally good results are obtained.

EXAMPLE 5

When diethylene glycol dimethyl ether is substituted for dimethoxy ethane in Example 1 an equally satisfactory electrolyte is obtained for the battery of the invention.

The following specific properties of a battery constructed according to the invention in button form should also be noted.

The battery rest potential is between 2.8 and 3.0 volts. This potential drops to approximately 2.4 volts at the beginning of a 1 ma discharge, measured at a button cell with a diameter of 25 mm and a height of about 6 mm. Upon continued discharge of the battery at 1 ma, the voltage gradually declines to a value of approximately 1.8 volts. This latter value is not reached until after 200 hours.

Short periods of discharge at higher rates do not greatly depress the battery voltage. For example, during a 4 minute discharge interval at 8 ma, the battery voltage remains above 2 volts. For longer periods of discharge at various levels, the relationship shown in the accompanying drawing has been observed. In this drawing, there is plotted the current-voltage relationships for six different current values, maintained in each case over a 30 minute interval. The broken curve shows the relationship for a battery with 10% copper(I) oxide added to the mass. The solid curve shows the relationship for a battery without this additive.

I claim:

1. In an electrical cell with a negative lithium, calcium, aluminum or magnesium electrode and a positive sulphur electrode and an electrolyte comprising a conductive salt and an organic solvent which contains boron trifluoride, the improvement being that the organic electrolyte comprises a di(lower alkyl) carbonate wherein the lower alkyl is up to three carbon atoms and an ether selected from the group of gylcol ethers having one of the formulas:

diethyl ether and di-iso-propyl ether.

2. The cell of claim 1 wherein the organic electrolyte comprises a mixture of dimethyl carbonate and 1,2-dimethyoxy ethane.

3. The cell of claim 1, wherein said salt is selected from the group of $LiBF_4$, $LiAlCl_4$ and $LiF$.

4. The cell of claim 2, wherein said dimethyl carbonate and 1,2-dimethoxy ethane are present in said mixture in the proportion of about 1 : 2 by weight.

5. The cell of claim 4, wherein said electrolyte comprises about 20 percent by weight dimethyl carbonate, about 45 percent by weight 1,2-dimethoxy ethane, about 20 percent by weight boron trifluoride, and about 10 percent by weight $LiBF_4$.

6. The cell of claim 1, wherein boron trifluoride is present in the proportion of at least about 15 percent by weight.

7. The cell of claim 1, further comprising a positive electrode including the following:

| | |
|---|---|
| Sulphur | 30 – 70 percent by weight |
| Binder | 0 – 12 percent by weight |
| Asbestos fiber | 2 – 10 percent by weight |
| Conductive material | 20 – 68 percent by weight. |

8. The cell of claim 1, wherein said electrodes have been vacuum-dried before incorporation into the battery.

9. The cell of claim 1, wherein said negative electrode is in the form of a lithium foil pressed onto expanded copper or nickel.

* * * * *